United States Patent [19]
Manz et al.

[11] Patent Number: 5,182,918
[45] Date of Patent: Feb. 2, 1993

[54] REFRIGERANT RECOVERY SYSTEM

[75] Inventors: Kenneth W. Manz, Paulding; Christopher M. Powers, Bryan; both of Ohio

[73] Assignee: SPX Corporation, Muskegon, Mich.

[21] Appl. No.: 887,887

[22] Filed: May 26, 1992

Related U.S. Application Data

[63] Continuation-in-part of Ser. No. 799,433, Nov. 26, 1991.

[51] Int. Cl.$^5$ ............................................ F25B 45/00
[52] U.S. Cl. .................................. 62/149; 62/292; 62/77
[58] Field of Search .................. 62/77, 85, 149, 195, 62/292, 475

[56] References Cited

U.S. PATENT DOCUMENTS

| | | | |
|---|---|---|---|
| 4,261,178 | 4/1981 | Cain | 62/292 |
| 4,441,330 | 4/1984 | Lower et al. | 62/292 |
| 4,768,347 | 9/1988 | Manz et al. | 62/292 |
| 4,856,289 | 8/1989 | Lofland | 62/292 |
| 4,981,020 | 1/1991 | Scuderi | 62/292 |

*Primary Examiner*—John Sollecito
*Attorney, Agent, or Firm*—Barnes, Kisselle, Raisch, Choate, Whittemore & Hulbert

[57] ABSTRACT

A refrigerant recovery system that includes a refrigerant accumulator having an inlet port for connection to the liquid port of equipment from which refrigerant is to be recovered, a vapor outlet port and a liquid outlet port. The liquid outlet port of the accumulator is connected to the inlet of a liquid refrigerant pump, which has an outlet for connection to a refrigerant storage container. A valve is responsive to pressure differential between the liquid refrigerant pump and the accumulator for operatively connecting the accumulator vapor outlet port to the inlet of a compressor. Thus, operation of the compressor functions to draw refrigerant from the equipment under service into the accumulator by reducing pressure within the accumulator, while the liquid pump operates to pump liquid refrigerant collected with the accumulator directly to the refrigerant storage container bypassing the compressor. The valve limits pressure differential across the liquid pump.

11 Claims, 3 Drawing Sheets

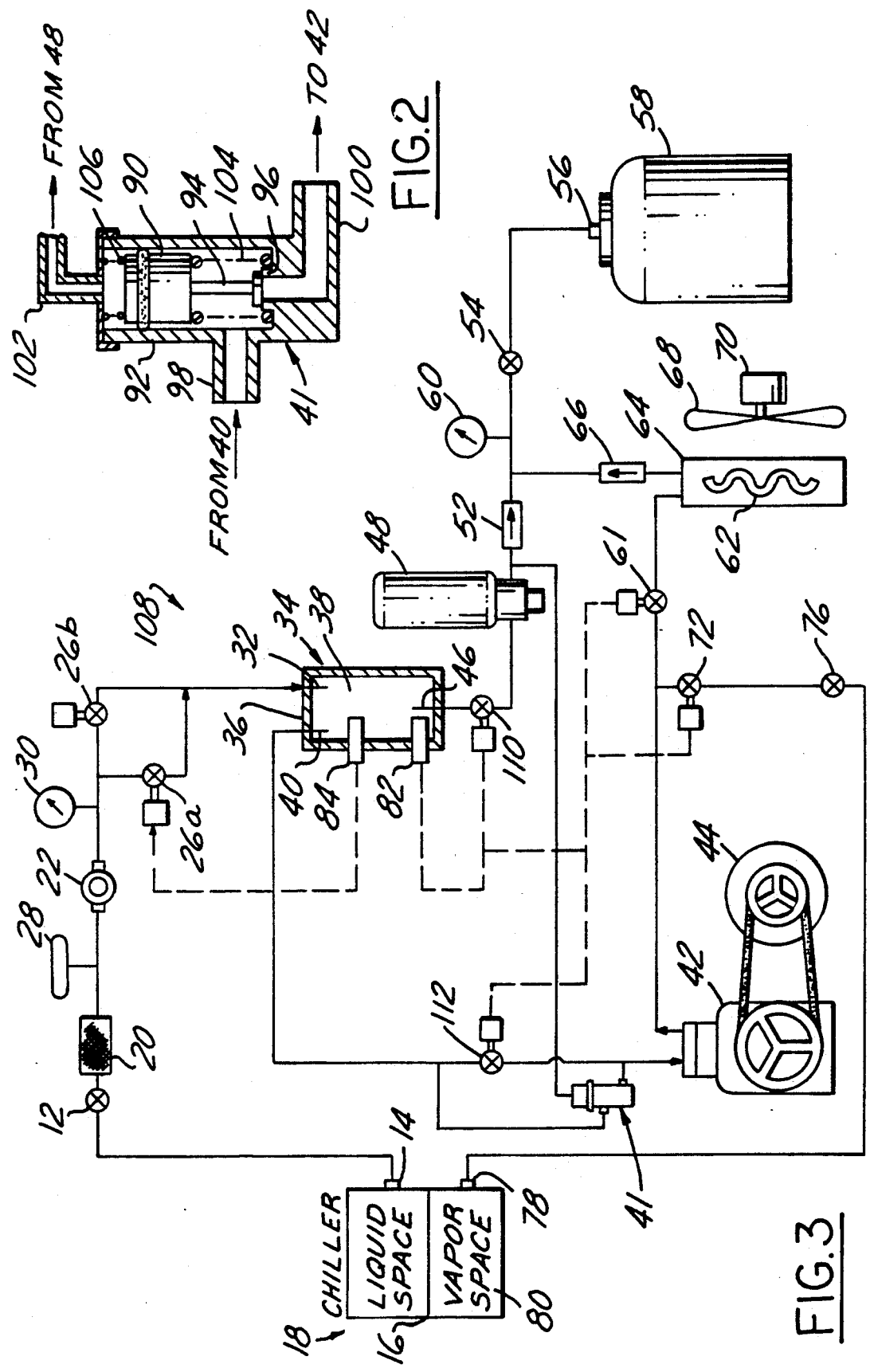

REFRIGERANT RECOVERY SYSTEM

This application is a continuation-in-part of application Ser. No. 07/799,433 filed Nov. 26, 1991.

The present invention is directed to systems for recovering refrigerant from refrigeration equipment such as air conditioning and heat pump equipment, and more particularly to a system for recovering refrigerant primarily in liquid phase.

BACKGROUND AND OBJECTS OF THE INVENTION

Many scientists contend that release of refrigerants into the atmosphere deleteriously affects the ozone layer that surrounds and protects the earth from ultraviolet solar radiation. Recent international discussions and treaties, coupled with related regulations and legislation, have renewed interest in devices for recovery and storage of used refrigerants from refrigeration equipment for later purification and reuse, or for proper disposal. U.S. Pat. No. 4,261,178, assigned to the assignee hereof, discloses a refrigerant recovery system in which the inlet of a compressor is coupled through an evaporator and through a manual valve to the refrigeration equipment from which refrigerant is to be recovered. The compressor outlet is connected through a condenser to a refrigerant storage container. The condenser and evaporator are combined in a single assembly through which cooling air is circulated by a fan. Content of the storage container is monitored by a scale upon which the container is mounted for sensing weight of liquid refrigerant in the container, and by a pressure switch coupled to a the fluid conduit between the condenser and the container for sensing vapor pressure within the storage container. A full-container condition sensed at the scale or a high-pressure condition sensed at the pressure switch terminates operation of the compressor motor. A vacuum switch is positioned between the inlet valve and the evaporator for sensing evacuation of refrigerant from the refrigeration equipment and automatically terminating operation of the compressor motor.

U.S. Pat. No. 4,768,347, also signed to the assignee hereof, discloses a refrigerant recovery system that includes a compressor having an inlet coupled through an evaporator and through a solenoid valve to the refrigeration equipment from which refrigerant is to be withdrawn, and an outlet coupled through a condenser to a refrigerant storage container or tank. The refrigerant storage container is carried by a scale having a limit switch coupled to control electronics to prevent or terminate further refrigerant recovery when the container is full. The scale comprises a platform pivotally mounted by a hinge pin to a wheeled cart, which also carries the evaporator/condenser unit, compressor, control electronics, and associated valve and hoses.

Although the systems disclosed in the noted patents address and overcome problems theretofore extant in the art, further improvements remain desirable. For example, a problem remains relative to recovering refrigerant from large commercial chiller systems and the like that employ low-pressure refrigerants such as R11 and R123. The boiling point of trichloro-monofluoromethane (R11) is 74.9° F., and the boiling point of dichloro-trifluoroethane (R123) is 82.2° F. In order to function at normal evaporation temperatures in the 40° to 50° F. range, each of these refrigerants must operate at a considerable vacuum. A recovery system for low-pressure refrigerant of this character would require an significant amount of auxiliary heat in an evaporator if the refrigerant were pumped during recovery only in vapor phase, requiring excessive energy and long recovery times.

Copending parent application Ser. No. 07/799,433 discloses a refrigerant recovery system that includes a refrigerant accumulator having an inlet port for connection to the liquid port of equipment from which refrigerant is to be recovered, a vapor outlet port connected to the inlet of a refrigerant compressor, and a liquid outlet port. The liquid outlet port of the accumulator is connected to the inlet of a liquid refrigerant pump, which has an outlet for connection to a refrigerant storage container. A liquid refrigerant sensor is coupled to the accumulator and responsive to presence of liquid refrigerant within the accumulator. Valves are coupled to the compressor outlet and responsive to presence of liquid within the accumulator for connecting the compressor outlet either to the vapor port of the equipment from which refrigerant is to be recovered for pressurizing the refrigerant and enhancing flow of refrigerant to the accumulator, or through a fan-cooled condenser to the refrigerant storage container.

The liquid refrigerant pump in the system disclosed in the parent application is a magnetically coupled pump that is capable of pumping liquid refrigerant from the accumulator to the storage container against a limited head, typically between 30 and 60 psi depending upon the type of pump. This would not typically be a problem for low-pressure refrigerants such as R11 and R123, but would be a problem for high-pressure refrigerants such as R12, R22 and R502. However, the compressor may so reduce pressure within the vapor space of the accumulator that the pressure differential experienced by the liquid pump will decouple the pump. It is therefore a general object of the present invention to provide a system for recovering low-pressure and high-pressure refrigerants in which the refrigerant is recovered primarily in liquid phase, and in which the liquid pump is protected against excess pressure differential across the pump. Another and more specific object of the present invention is to provide a refrigerant recovery system of the described character that is adapted to control pressure differential across the liquid pump in association with differing refrigerants and/or varying ambient temperatures.

SUMMARY OF THE INVENTION

A refrigerant recovery system in accordance with the present invention includes a refrigerant accumulator having an inlet port for connection to the liquid port of equipment from which refrigerant is to be recovered, a vapor outlet port and a liquid outlet port. The liquid outlet port of the accumulator is connected to the inlet of a liquid refrigerant pump, which has an outlet for connection to a refrigerant storage container. A valve is responsive to pressure differential between the liquid refrigerant pump outlet and the accumulator for operatively connecting the accumulator vapor outlet port to the inlet of a compressor. Thus, operation of the compressor functions to draw refrigerant from the equipment under service into the accumulator by reducing pressure within the accumulator, while the liquid pump operates to pump liquid refrigerant collected with the accumulator directly to the refrigerant storage container bypassing the compressor. The valve limits pressure differential across the liquid pump.

In the preferred embodiment of the invention, the pressure differential valve comprises a refrigerant flow control valve having a first input connected to the accumulator vapor port and a second input connected to the outlet of the liquid refrigerant pump. Flow of refrigerant from the first input to the valve output and the compressor inlet is controlled as a function of pressure differential between the first and second valve inputs. Preferably, the valve will be fully closed at a relatively high differential pressure such as between 50 to 55 psi, and fully open at a lower differential pressure such as between 25 to 30 psi. This differential pressure range accommodates use in connection with differing types of refrigerants and under differing ambient temperature conditions. In a second embodiment of the invention, the valve comprises a solenoid valve coupled to an electronic differential pressure sensor having inputs coupled to the accumulator vapor port and the liquid pump outlet.

BRIEF DESCRIPTION OF THE DRAWINGS

The invention, together with additional objects, features and advantages thereof, will be best understood from the following description, the appended claims and the accompanying drawings, in which:

FIG. 2 is a more detailed schematic diagram of the compressor inlet flow control valve illustrated in FIG. 1; and FIGS. 3 and 4 are schematic diagrams of refrigerant recovery system in accordance with modified embodiments of the invention.

DETAILED DESCRIPTION OF PREFERRED EMBODIMENT

Figure 1:
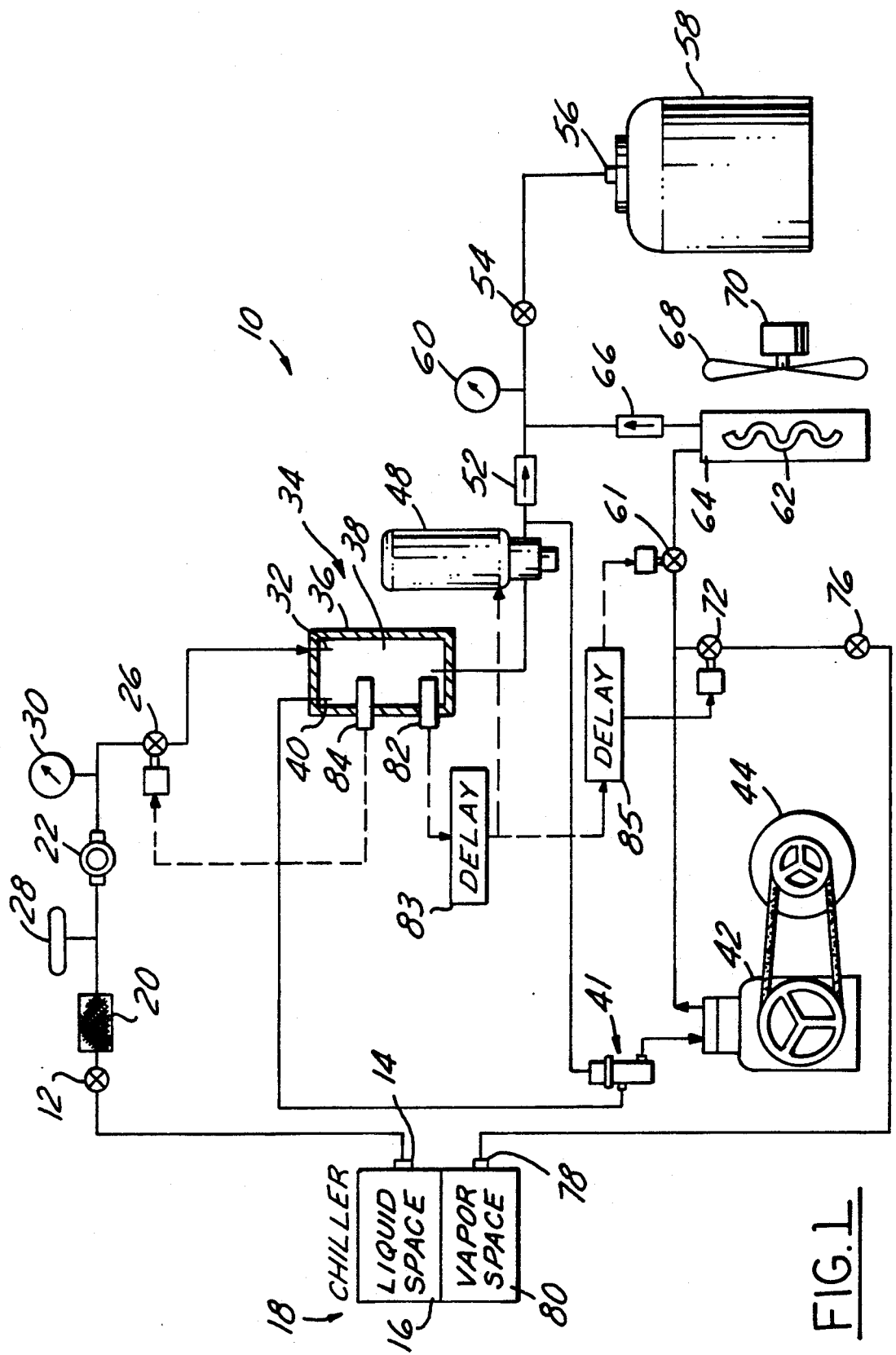
FIG. 1 is a schematic diagram of a refrigerant recovery system in accordance with a presently preferred embodiment of the invention for recovering refrigerant.

FIG. 1 illustrates a refrigerant recovery system 10 in accordance with a presently preferred embodiment of the invention as comprising an input valve 12 coupled to a connector 14 for connection to the liquid port of the liquid space 16 of a chiller 18 from which refrigerant is to be withdrawn. Refrigerant from valve 12 is fed through a filter 20 and a sight glass 22 to the inlet side of a flow control solenoid valve 26. A pressure sensor 28 is connected between filter 20 and sight glass 22. A pressure gauge 30 is connected between sight glass 22 and valve 26. A refrigerant accumulator 34 comprises a canister 36 having an open internal volume 38. An inlet port 32 positioned at the upper portion of volume 38 is connected to the outlet side of valve 26. A vapor outlet port 40, also positioned at the upper portion of canister volume 38, is connected through a flow control valve 41 to the inlet of a refrigerant compressor 42 driven by an electric motor 44. Accumulator 34 also has a liquid refrigerant outlet port 46 disposed at the lower portion of canister volume 38.

A liquid refrigerant pump 48 has an inlet connected to accumulator liquid outlet port 46, and an outlet connected through a check valve 52 and a manual valve 54 to a connector 56 for coupling to a refrigerant storage container 58. A pressure gauge 60 is connected between check valve 52 and valve 54 for monitoring pressure within container 58. The outlet of compressor 42 is connected through a solenoid valve 61, the coil 62 of a condenser 64, and thence through a check valve 66 to manual valve 54 in parallel with valve 52. A fan 68 is driven by a motor 70 for cooling condenser 64. The outlet of compressor 42 is also connected through a solenoid valve 72 and a manual valve 76 to a connector 78 for coupling to the chiller vapor space 80.

A first liquid refrigerant level sensor 82 is disposed in the lower portion of canister volume 38, and is connected to the solenoids of valve 61 and 72 for opening valve 72 and closing valve 61 when liquid refrigerant is present at the lower portion of canister volume 38, and for closing valve 72 and opening valve 61 when such liquid refrigerant is absent. A second liquid refrigerant level sensor 84 is positioned at a intermediate level within canister volume 38 above sensor 82 and below the top of the canister for sensing a higher level of liquid refrigerant within the canister volume. Sensor 84 is operatively coupled to the solenoid of valve 26 for opening valve 26 when liquid refrigerant within accumulator 34 is below the level of sensor 84, or closing valve 26 when liquid refrigerant within accumulator 34 is at the level of sensor 84. Sensors 82, 84 may be of any suitable type. The liquid refrigerant flow rate through valve 26 is greater than the flow rate of liquid pump 48.

In operation, an operator first couples connector 14 to the liquid port of chiller 18, and couples connector 78 to the vapor port of the chiller. Connector 56 is coupled to the vapor port of container 58. The operator may then initiate a recovery operation, whereupon electrical power is applied to motor 44 to energize compressor 42, to motor 70 for energizing fan 68, and to solenoid of valve 26 to open the valve. At this point, it is assumed that accumulator 34 is empty, so that sensor 82 would normally close valve 72 and open valve 61, and sensor 84 opens valve 26. To prevent compressor 42 from pressurizing container 58, the control circuity holds valve 72 open and valve 61 closed for an initial period to allow liquid refrigerant to collect in accumulator 34 and activate sensor 82, which then assumes control of valves 61, 72. Compressor 42 functions to reduce pressure within accumulator 34 while pressurizing chiller 18 to draw the refrigerant from chiller 18 through the liquid port primarily in liquid phase.

As liquid refrigerant flows into accumulator 34 through valve 26 and begins to accumulate within the accumulator, sensor 82 assumes control of valves 61, 72. When liquid refrigerant reaches the level of sensor 82, sensor 82 activates liquid refrigerant pump 48 to pump the liquid refrigerant from accumulator 34 directly into storage container 58. At the same time, sensor 82 holds valve 72 open so that vapor drawn from accumulator 34 by compressor 42 is automatically returned to vapor space 80 of chiller 18. As operation continues, since the flow capacity of valve 26 is greater than flow capacity of liquid refrigerant pump 48, the liquid refrigerant rises within accumulator 34, eventually reaching the level of sensor 84. At this point, sensor 84 closes valve 26. In this way, sensor 84 prevents over filling of accumulator 34 and possible feeding of liquid refrigerant to compressor 42. Pump 84 begins to draw down liquid refrigerant from within accumulator 34. When the liquid refrigerant is again below the level of sensor 84, sensor 84 opens valve 26 to allow inlet flow. Valve 84 thus functions to maintain the level of liquid refrigerant within accumulator 34 at about the level of sensor 84 as long as liquid refrigerant is available from chiller 18.

As chiller 18 empties of liquid refrigerant, the liquid refrigerant within accumulator 34 falls below the level of sensor 84, opening valve 26. As pump 48 continues to draw liquid from accumulator 34, the liquid refrigerant level eventually falls below the level of sensor 82. A delay 83 between sensor 82 and pump 48 allows pump 48 to operate for an additional time to empty accumulator 34 and the line connecting the accumulator to the pump. An additional delay 85 holds valve 61 closed and valve 72 open to allow any remaining liquid in chiller 18 to enter accumulator 34. In the meantime, compressor 42 continues to pull refrigerant vapor from chiller 18 and accumulator 34, and to feed such vapor through condenser 64 to storage container 58. When the vapor pressure of refrigerant within chiller 18 falls below the level of sensor 28, sensor 28 signals termination of the recovery operation, and terminates operation of motors 44, 70 and valve 26, which is now completely closed.

The structure and function of valve 41 are illustrated schematically in FIG. 2. Valve 41 comprises a piston 90 slidably disposed within the cavity of a valve body 92. A valve stem 94 projects from piston 90 for engagement with a valve seat 96. A first inlet port 98 of valve 41 is connected to accumulator vapor port 40 (FIG. 1), while the outlet port 100 is connected to the inlet of compressor 42. The control port 102 of valve 41 is connected to the outlet of liquid pump 48 (FIG. 1). A coil spring 104 is captured in compression between piston 90 and valve seat 96 for normally urging piston 90 and valve stem 94 away from seat 96. A second coil spring 106 is disposed in the cavity on the opposing side of piston 90 that opens to control port 102 for helping to balance the load on piston 90.

In operation, position of piston 90 and valve stem 94 within valve body 92 varies as a function of the difference between the pressure on one side of piston 90, which is the sum of pressures exerted by spring 104 and refrigerant at inlet 98, and pressure on the opposing of piston 90, which is the sum of pressures exerted by spring 106 and refrigerant at control port 102. Thus, when the pressure of refrigerant at the outlet side of liquid pump 48 exceeds pressure of refrigerant within the vapor spaced of accumulator 34 by more than the pressure of spring 104 minus spring 106, piston 90 and valve stem 94 move toward valve seat 96 so as to reduce refrigerant flow. In this way, compressor 42 is prevented from so reducing vapor pressure within accumulator 34 as to exceed the pressure differential capacity of liquid refrigerant pump 48.

FIG. 3 illustrates a modified embodiment 108 of the invention in which a solenoid valve 110 is connected between liquid port 46 of accumulator 34 and the inlet port of liquid refrigerant pump 48. Valve 110 is controlled by level sensor 82, which opens valve 110 so as to pass liquid refrigerant to pump 48 when the liquid refrigerant within accumulator 34 is above the level of sensor 82, and closes valve 110 when liquid refrigerant within the accumulator falls below the level of sensor 82. Sensor 82 is also connected to operate a solenoid valve 112 connected across flow control valve 41 for bypassing the flow control valve and connecting accumulator vapor port 40 to the compressor inlet when liquid refrigerant within accumulator 34 is below the level of sensor 82. Thus, accumulator 34 is fully open to compressor 42 when liquid pump 48 is isolated by valve 110 at low liquid refrigerant levels. The accumulator inlet valve 26 in FIG. 1 is replaced in the embodiment of FIG. 3 by a first valve 26a controlled by level sensor 84, and a second valve 26b parallel to valve 26a and controlled by the system electronics. Valve 26b remains open during a recovery operation, and valve 26a is closed by operation of sensor 84 so as to prevent passage of liquid refrigerant to accumulator 34. The embodiment 108 illustrated in FIG. 3 is otherwise similar to system 10 hereinabove described.

Figure 4:
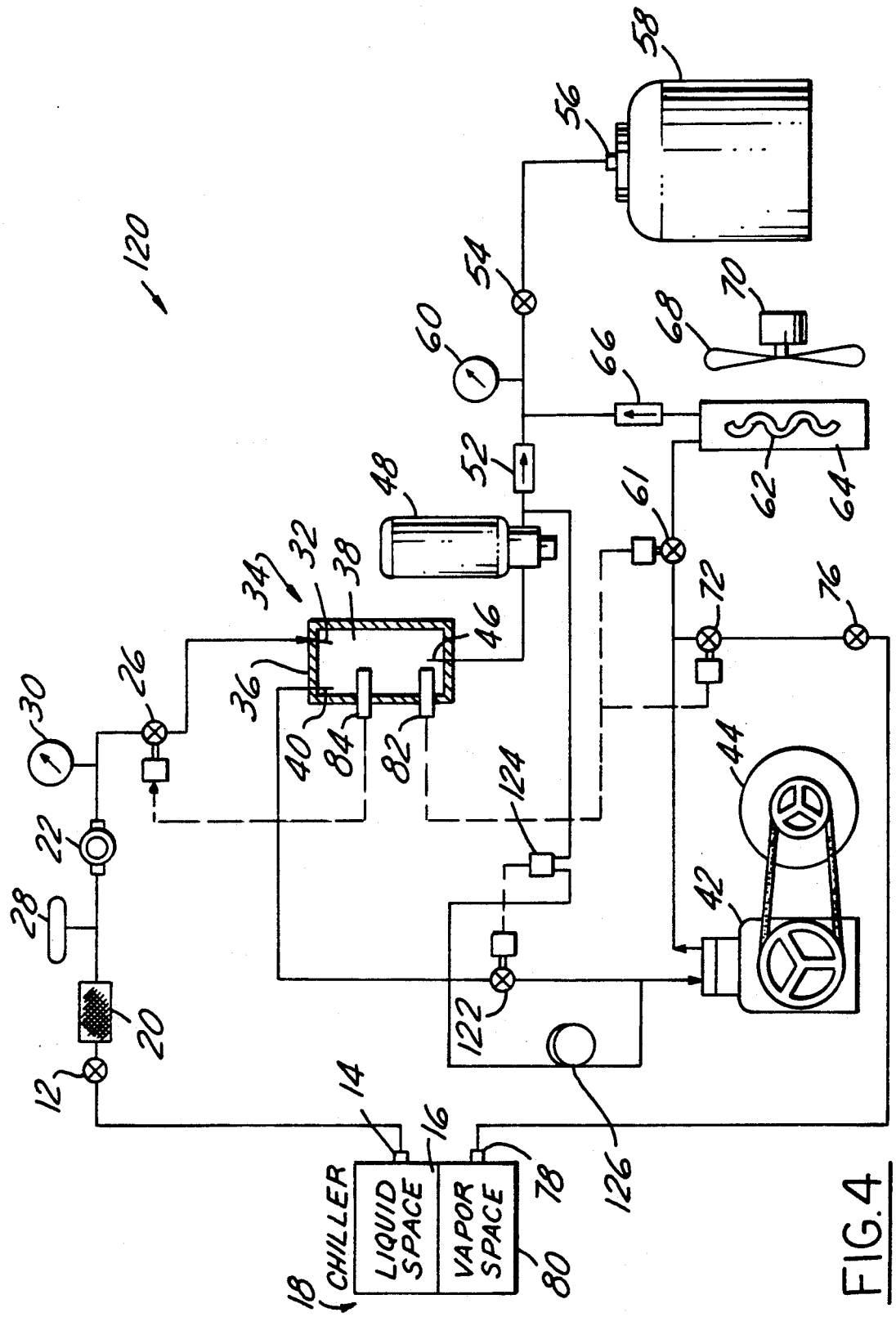

FIG. 4 illustrates another modified embodiment 120 in which pressure differential flow control valve 41 in the embodiments of FIGS. 1 and 2 is replaced by a solenoid valve 122 and an electronic pressure sensor 124 that controls operation of solenoid valve 122. Solenoid valve 122 is connected between accumulator vapor port 40 and the inlet of compressor 42. Pressure sensor 24 receives control inputs from vapor port 40 at the inlet side of valve 122, and from the outlet side of liquid refrigerant pump 48. Pressure sensor 124 may be of any suitable type for providing an electrical control signal as a function of pressure differential between the control inputs so as to operate solenoid valve 122 when such pressure differential exceeds a predetermined level. A capillary tube 126 is connected across valve 122 for limited admission of refrigerant vapor to the compressor inlet independently of valve 122. The embodiment 120 of FIG. 4 is otherwise identical to embodiment 10 of FIG. 1.

We claim:

1. A system for recovering refrigerant from refrigeration equipment comprising:
   a refrigerant compressor having an inlet and an outlet,
   refrigerant accumulator means having an inlet port, a vapor outlet port and a liquid outlet port,
   input means for connecting said inlet port of said accumulator means to the refrigeration equipment from which refrigerant is to be recovered,
   a liquid refrigerant pump having an inlet and an outlet,
   means for connecting said liquid refrigerant pump outlet to a refrigerant storage container,
   means for connecting said liquid outlet port of said accumulator means to said liquid refrigerant pump inlet such that said liquid refrigerant pump pumps liquid refrigerant from said liquid outlet port to the storage container, and
   means responsive to a pressure differential between said liquid refrigerant pump and said accumulator means for operatively connecting said vapor outlet port to said compressor inlet such that operation of said compressor functions to draw refrigerant from said input means into said accumulator means while limiting pressure differential across said liquid refrigerant pump.

2. The system set forth in claim 1 wherein said means responsive to said pressure differential comprises valve means having control inputs coupled to said vapor outlet port of said accumulator means and said liquid pump outlet.

3. The system set forth in claim 2 wherein said valve means comprises a refrigerant flow control valve.

4. The system set forth in claim 2 wherein said valve means comprises a solenoid valve and a pressure differential sensor having a first input operatively coupled to said vapor outlet port of said accumulator means, a second input operatively coupled to said liquid pump outlet and an output operatively coupled to said solenoid valve.

5. The system set forth in claim 2 further comprising means connected in parallel with said valve means between said vapor outlet port of said accumulator means and said compressor inlet for providing restricted flow of refrigerant vapor to said compressor inlet independent of said valve means.

6. The system set forth in claim 5 wherein said means connected in parallel with said valve means comprises a capillary tube.

7. The system set forth in claim 1 further comprising a liquid refrigerant sensor responsive to presence of liquid refrigerant within said accumulator means, and means for connecting said compressor outlet to the refrigeration equipment from which refrigerant is to be withdrawn comprising valve means responsive to said sensor such that refrigerant in vapor phase at said accumulator means from such equipment is returned to the equipment.

8. The system set forth in claim 7 further comprising means for connecting said compressor outlet to a refrigerant storage container when said valve means is closed for feeding refrigerant in vapor phase at said accumulator means to the storage container.

9. The system set forth in claim 7 further comprising means connecting said liquid refrigerant sensor to said liquid pump for operating said liquid pump, and thereby operatively connecting said liquid pump to said accumulator means, when liquid refrigerant is present in said accumulator means.

10. The system set forth in claim 9 further comprising first delay means between said sensor and said pump to continue operation of said pump for a limited time duration when liquid refrigerant falls below said sensor.

11. The system set forth in claim 10 further comprising second delay means between said sensor and said valve means for connecting said compressor outlet to the equipment for a limited time duration when liquid refrigerant falls below said sensor.

* * * * *